Sept. 1, 1953   O. F. QUARTULLO   2,650,440
BOWL EJECTING MECHANISM FOR CARRY-TYPE SCRAPERS
Filed March 21, 1949   4 Sheets-Sheet 4
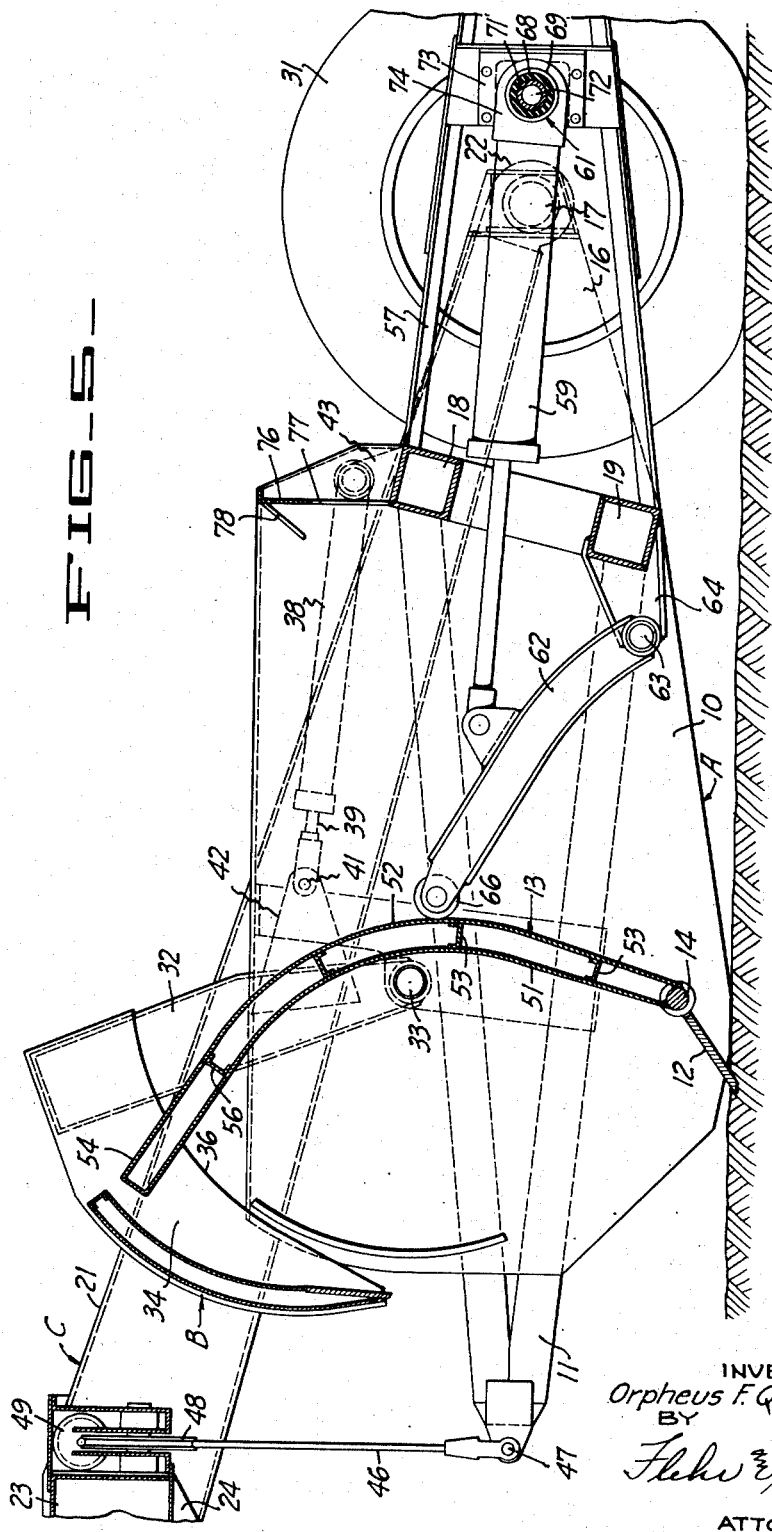
FIG_5
INVENTOR
Orpheus F. Quartullo
BY
ATTORNEYS Patented Sept. 1, 1953

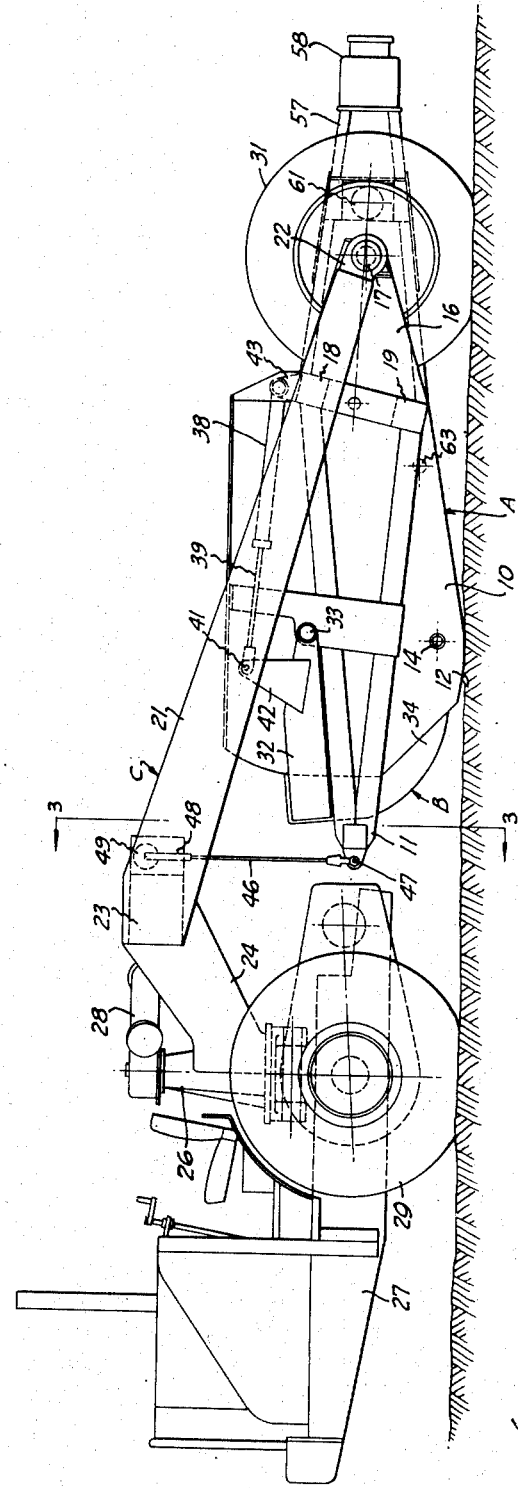
Sept. 1, 1953   O. F. QUARTULLO   2,650,440
BOWL EJECTING MECHANISM FOR CARRY-TYPE SCRAPERS
Filed March 21, 1949   4 Sheets-Sheet 1
INVENTOR
Orpheus F. Quartullo
BY
ATTORNEYS

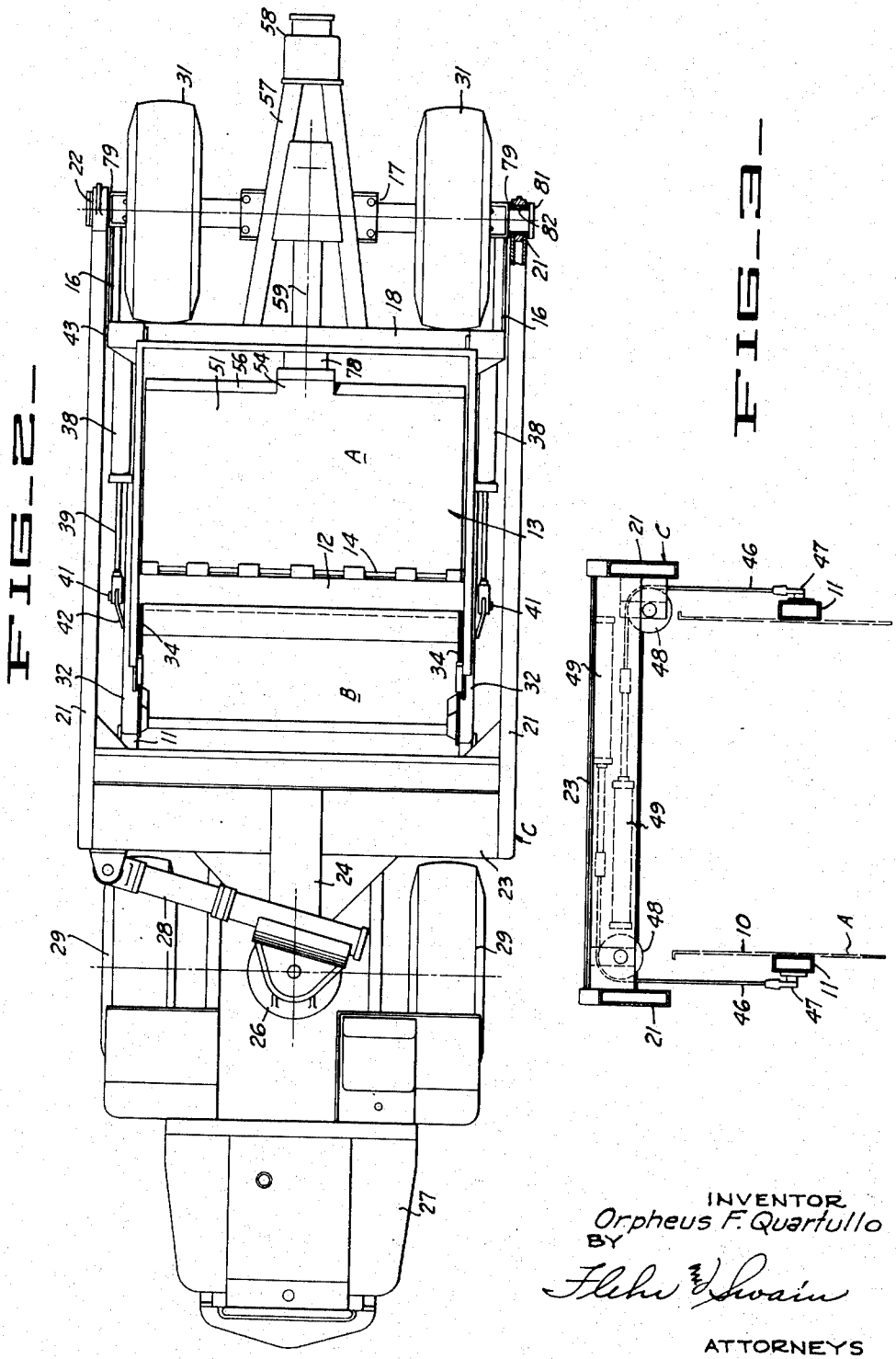

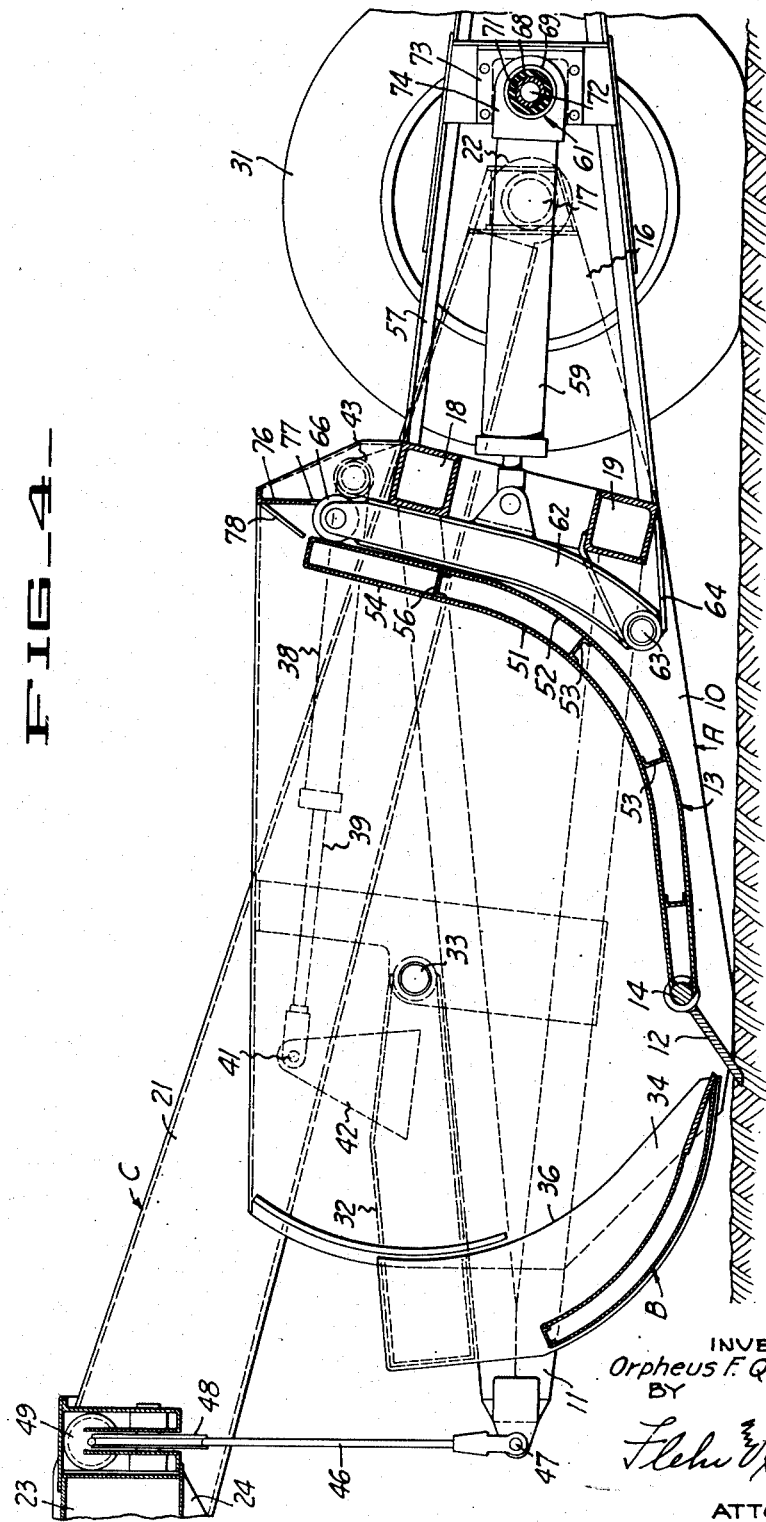

2,650,440

UNITED STATES PATENT OFFICE 2,650,440

BOWL EJECTING MECHANISM FOR CARRY-TYPE SCRAPERS

Orpheus F. Quartullo, Cleveland, Ohio, assignor to Wooldridge Manufacturing Company, Sunnyvale, Calif., a corporation of Nevada Application March 21, 1949, Serial No. 82,513

2 Claims. (Cl. 37—126)

This invention relates generally to earth movers or carrier scrapers of the type used for earth digging, carrying and filling operations.

Earth moving machines of the above type generally make use of a main bowl having a forward cutting blade, and mounted on a wheeled frame in such a manner that it can be adjusted relative to its height, and traversed over a ground surface for digging, carrying and filling or spreading operations. The bowl is provided with a load expeller which is movable between load carrying and discharge positions, and which is frequently in the form of a hinged member forming the bottom and rear walls of the bowl. The load carrying capacity of the bowl is generally increased by the use of a front apron or auxiliary bowl, which can be raised or lowered relative to the cutting blade.

Suitable means must be provided with such machines for manipulating the parts during digging, carrying and discharge of the load. Thus during loading the front apron is raised to permit material to pass over the cutting blade into the main bowl, and the cutting blade is adjusted for proper digging. After the machine has been loaded, the front apron is permitted to drop down to close upon the cutting blade, and the bowl is then raised to an elevated position and carried to a point of discharge. To carry out a discharge operation the front apron is raised, and the expeller is moved toward discharge position whereby the load is caused to discharge over the cutting blade and between this blade and the apron.

The most common operating means employed for such machines is an arrangement of cables which are reeved through sheaves, and which are operated by a manually controlled winch. With such machines it is common to provide structural parts extending over the main bowl, and which are objectionable in certain types of loading operations, as where it is desired to load the bowl by the use of a power shovel. Hydraulic operators have also been used, particularly for the smaller sizes of earth movers. However, the use of a hydraulic operator for operating the expeller of the main bowl has presented a difficult problem, particularly where the expeller is of the hinged bottom type, because of the extent of movement required and difficulty involved in securing such movement from a simple type of hydraulic operator or ram.

It is an object of the present invention to provide an improved earth mover of the above type having novel and improved hydraulic means for operating the expeller for the main bowl.

Another object of the invention is to provide an improvement as described in the foregoing paragraph, which is particularly applicable to expellers of the hinged bottom type, and which is relatively simple in that it requires only a single operating ram to move the hinged bottom between load carrying and discharge positions.

Another object of the invention is to provide novel hydraulic means for operating the hinged bottom of an earth mover bowl, and which is disposed in combination with frame parts of the machine in such a manner that the hydraulic means is protected against injury, and may be of substantial length without increasing the overall length of the machine.

Additional objects of the invention will appear from the following description in which the preferred embodiment has been set forth in detail in conjunction with the accompanying drawing.

Referring to the drawing:

Figure 1 is a side elevational view of an earth mover incorporating the present invention.

Figure 2 is a top plan view of the machine illustrated in Figure 1.

Figure 3 is a cross-sectional view taken along the line 3—3 of Figure 1.

Figure 4 is a partial cross-sectional view taken through the main bowl of the machine and showing the operating parts in load carrying position.

Figure 5 is a view similar to Figure 4 but showing the parts in load discharging position.

The earth mover illustrated in the drawing consists generally of a main bowl A, a cooperating front apron or auxiliary bowl B, and a yoke-like frame C. The general arrangement of these parts can be similar to the machine shown in Clark 2,368,202. The main bowl A consists of the side walls 10 and the inclined digging blade 12. The side walls are fabricated in such a manner as to form a part of side beams which have forward extensions 11. A hinged bottom 13 extends between the side walls and has a pivotal connection 14 with the mounting of the cutting blade. The hinged bottom is shown in normal position in Figure 4 and in load discharging position in Figure 5. The sides of the bowl also have rear extensions 16 to which the rear axle assembly 17 is attached.

At a point forward of the rear axle assembly, but generally toward the rear extremities of the side walls 10, these walls are rigidly interconnected by the laterally extending and vertically spaced beams 18 and 19.

The yoke C consists of two side branches or beams 21 which have their rear ends pivotally connected by assemblies 22 to the rear axle assembly. The forward ends of the side arms 21 are connected by a laterally extending beam 23, which in turn is connected to the gooseneck extension 24. This extension may be provided with suitable universal coupling means for attaching the same to a tractor, or as illustrated, it may be connected by a king pin assembly 26 to a motor powered tractor 27. Suitable steering means can be incorporated with the king pin assembly, as for example a hydraulic operator 28 of the type disclosed and claimed in my co-pending application Serial No. 779,730, filed October 14, 1947, now Patent No. 2,557,513. The motor powered tractor 27 is provided with suitable rubber tired driving wheels 29, and suitable rear rubber tired wheels 31 are carried by the rear axle assembly 17.

The apron B normally extends across the forward open end of the main bowl, and is attached to the side arms 32, which in turn have pivotal connections 33 with the sides 10 of the main bowl. Thus the apron may be swung between raised open and lowered closed positions relative to the cutting blade 12. In the particular construction illustrated, the apron B is provided with side plates 34 having arcuately contoured edges 36. Plates 34 extend within and in overlapping relationship with the adjacent forward edge portions of the bowl's side walls. The arms 32, which are exterior to the side walls of the main bowl, are operatively connected to the hydraulic operating rams 38. These hydraulic rams can be of the conventional single acting type, consisting of a cylinder fitted with a piston, with the piston being attached to an operating rod. The operating rods 39 of the hydraulic rams 38 have pivotal connections 41 with arms 42. The arms 42 can be in the form of plates welded to and normally extending upwardly from the arms 32. Application of hydraulic liquid under pressure to both of the rams 38 serves to swing the arms 32 upwardly, to thereby raise the apron B from closed to full open positions. The rear ends of the rams 38 are suitably attached to the side walls of the bowl by means of the connecting assemblies 43, which may include a rubber bushing for the purpose of absorbing shocks.

The main bowl A can be raised or lowered about the axis of the rear axle assembly by means such as shown in my aforesaid co-pending application. Thus a pair of pull cables 46 are employed, having their lower ends attached at 47 to the forward extremities 11 of the bowl side walls. These cables engage sheaves 48 which are mounted on the cross beam 23, and the cable extremities are connected to the hydraulic rams 49. The rams can be mounted upon the beam in the manner disclosed in said application, that is they can be disposed side-by-side, with their cylinders mounted directly upon the adjacent side wall of the beam 26. Application of liquid under pressure to the two hydraulic rams 49 applies equalized lifting forces to the cables 46, in order to elevate and adjust the main bowl to any desired position.

The hinged bottom 13 consists of the curved steel plates 51 and 52 which are separated by and welded to the stiffening and spacing members 53. A projection 54 extends from the upper edge 56 of the hinged bottom and serves a purpose to be presently explained.

Extending to the rear of the main bowl there is a hollow structure 57, which can be fabricated from steel plates, and which is contoured convergent toward the rear end of the machine. The rear end of structure 57 carries a bumper 58 to facilitate pushing the machine over rough terrain and during loading. Housed within the structure 57 there is a hydraulic ram 59, the rear end of which is anchored to the structure 57 by the connecting assembly 61. This ram is likewise of the single acting piston-cylinder type. The assembly 61 permits swinging movement of the ram 59 in a vertical direction about the axis of the assembly 61. Disposed between the ram 59 and the hinged bottom 13 there is an arm 62 which is pivotally mounted at 63 to a bracket 64 carried by the beam 19. A roller 66 is journaled to the upper end of arm 62, and is arranged to engage the rear plate 52 of the hinged bottom 13.

It will be evident that when the arm 62 is swung to the left as viewed in Figure 4, engagement between roller 66 and the rear plate 52 of the hinged bottom causes the hinged bottom to be swung from load carrying to discharge position. Full discharge position is shown in Figure 5. When the hinged bottom swings back to its load carrying position by gravity, the arm 62 is returned to its initial position, and liquid previously introduced into the hydraulic ram is exhausted.

It is desirable that the assembly 61 include shock absorbing or cushioning means. Thus this assembly includes a rubber bushing 68 which is disposed between the outer sleeve 69 and the inner metal bushing 71. A pin 72 extends through the metal bushing 71, and is attached to bracket members 73, forming a part of the structure 57. The outer sleeve 69 is a part of an end cap 74, which is carried by the cylinder of the hydraulic ram.

At the rear end of the bowl and above the normal position of the roller 66, it is desirable to provide a plate 76 which extends between the side walls of the bowl, above the beam 18. Plate 76 is cut away at 77 to accommodate the roller 66. Above the portion 54 of the hinged bottom it is desirable to provide an inclined apron 78, which tends to prevent material from falling down upon the roller 66.

As previously mentioned it is desirable that the connections between the rear ends of the yoke arms 21 and the rear axle assembly incorporate cushioning means. Thus on each side of the machine the rear axle assembly is provided with projecting studs 79, which are embraced by collars 81 carried by the rear ends of the arms 21. Between each stud 79 and its associated collar 81 there is a bushing 82 formed of suitable resilient material such as natural or synthetic rubber.

As previously mentioned all of the hydraulic rams may be single acting with reliance upon the force of gravity to return the same to normal position after an actuation. If desired one or more springs can be employed to aid in the return of the hinged bottom 13 from the full actuated position shown in Figure 5 to the position shown in Figure 4. Suitable hydraulic piping and hose connections are provided between each of the hydraulic rams and the hydraulic pressure system employed. In a typical instance the hydraulic pressure system will consist of a high pressure pump operated for example by the engine of the tractor, together with a control valve enabling the liquid under pressure to be supplied from the pump to the hydraulic rams, at the will of the operator. For the arrangement described three control valves can be employed, one connected to the two rams 38, one to the two rams 49, and one to the ram 59.

Operation of my machine can now be reviewed as follows: Assuming that it is desired to use the machine in a conventional way for digging, carrying and discharge operations, the main bowl and the cutting blade 12 are lowered by control of the rams 49 until a cut of the desired depth is being taken. At the same time hydraulic rams 38 are actuated to elevate the apron B, thus providing an opening above the blade for entrance of earth. During a loading operation the hinged bottom 13 is in its normal load carrying position, shown in Figure 4. At the completion of a loading operation the apron B is permitted to fall by control of the rams 38, and at the same time the main bowl is raised by actuation of rams 49, until the blade is clear of the ground. The load is now carried to the point of discharge. Assuming that it is desired to spread the load, the bowl is lowered according to the depth of spread desired, and the rams 38 are operated to raise the apron B, and thus permit the load to discharge between the apron and the cutting blade. At the same time or shortly after the apron B has been raised, the ram 59 is operated to swing the hinged bottom 13 upwardly and forwardly to effect discharge of the load from the main portion of the bowl. By the time the hinged bottom 13 has reached its full discharge position shown in Figure 5, all of the load will have been discharged. The hinged bottom is now permitted to return to load carrying position, and the machine is in condition for a new loading operation.

It will be evident that the hydraulic ram 59, in conjunction with the arm 62 and the hinged bottom 13, provides a desirable means for discharging the main bowl. The hydraulic ram can be sufficiently long to provide a length of stroke suitable for full movement of the hinged bottom between load carrying and discharge positions, without however increasing the over-all length of the machine. The mounting of the hydraulic ram within the structure 57 aids in attaining the above feature, and at the same time the hydraulic ram is fully protected against injury.

I claim:

1. In an earth mover, an earth carrying bowl having a forward digging blade, wheels serving to support said bowl for traversing movement over the ground, a structure forming bottom and rear walls for the bowl and pivoted to swing upwardly and forwardly between load carrying and discharge positions, the rear wall of said structure when in load carrying position extending upwardly and inclined toward the rear of the bowl, and operating means for said structure, said operating means comprising an upstanding lever disposed to the rear of the bowl, means forming a pivotal mounting for the lower end of said lever, a roller carried by the upper end of said lever and adapted to engage the rear face of said rear wall, said roller being disposed near the upper rear edge of said structure when said structure is in load carrying position, and means for swinging said lever forwardly to thereby move such structure between load carrying and discharge positions with camming action of the roller over said rear wall.

2. In an earth mover, an earth carrying bowl having a forward digging blade, wheels serving to support said bowl for traversing movement over the ground, a structure forming bottom and rear walls for the bowl, said structure being pivotally secured at its forward edge for swinging movement upwardly and forwardly between earth carrying and discharge positions, the rear wall of the structure extending upwardly and inclined toward the rear of the bowl when said structure is in earth carrying position, a hydraulic ram disposed to the rear of the bowl, an upstanding lever disposed between the ram and said rear wall, means forming a pivotal mounting for the lower end of said lever, a connection between said hydraulic ram and said lever, whereby operation of said ram serves to swing said lever forwardly and rearwardly, and a roller carried by the upper end of said lever and adapted to engage the rear face of said rear wall, said roller being disposed near the upper rear edge of said structure when said structure is in load carrying position, whereby when said lever is swung forwardly, said structure is swung upwardly and forwardly from load carrying to discharge position with camming action of the roller over said rear wall.

ORPHEUS F. QUARTULLO.

References Cited in the file of this patent

UNITED STATES PATENTS

| Number | Name | Date |
| --- | --- | --- |
| 2,136,102 | Heil | Nov. 8, 1938 |
| 2,345,313 | Armington et al. | Mar. 28, 1944 |
| 2,406,826 | French et al. | Sept. 3, 1946 |
| 2,458,274 | Kadz | Jan. 4, 1949 |